United States Patent Office 2,827,461
Patented Mar. 18, 1958

2,827,461

SYNTHESIS OF XANTHINES

David B. Guthrie, Clayton, Mo., assignor to Monsanto Chemical Company, St. Louis, Mo., a corporation of Delaware No Drawing. Application December 15, 1955
Serial No. 553,190

2 Claims. (Cl. 260—256)

This invention relates to the synthesis of xanthines, specifically theophylline and caffeine, and to new intermediates obtained thereby.

In the synthesis of caffeine (i. e. 1,3,7-trimethylxanthine) and theophylline (i. e. 1,3-dimethyl-xanthine) from 1,3-dimethyl-4-imino-dihydrouracil, the usual procedure is to (1) react the latter with nitrous acid (acetic acid plus an aqueous solution of sodium nitrite) to provide 1,3-dimethyl-4-imino-violuric acid, which (2) isonitroso compound is reduced to form 1,3-dimethyl-4-imino-5-amino-dihydrouracil, which (3) product is then converted to the formyl derivative by treatment with formic acid, which (4) formyl derivative is then treated with sodium hydroxide to provide theophylline (1,3-dimethyl-xanthine), which (5) theophylline should caffeine be the desired end product is then methylated with methyl iodide. Schematically this process is as follows:

In accordance with this invention it has been found that in the synthesis of caffeine or theophylline from 1,3-dimethyl-4-imino-dihydrouracil the lengthy expensive foregoing procedure can be avoided with the accompaniment of improved yields by initially reacting the said 1,3-dimethyl-4-imino-dihydrouracil with bromine or chlorine, neutralizing the hydrogen halide salt so obtained with alkali, and reacting the free base, i. e. 1,3-dimethyl-4-imino-5-(chloro or bromo)-dihydrouracil with an alkali metal derivative of a formamide of the structure

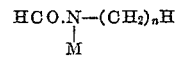

where M is an alkali metal (e. g. sodium or potassium) and where $n$ is 0 or 1. This novel process may be represented schematically as follows:

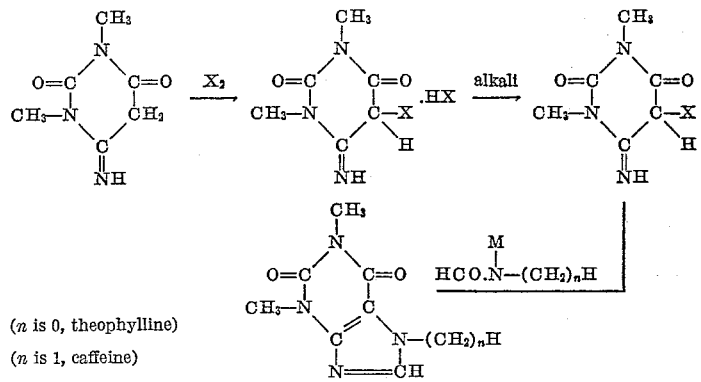

($n$ is 0, theophylline)
($n$ is 1, caffeine)

As illustrative of the preparation of the new compounds of this invention is the following:

*Example 1*

In a suitable reaction vessel is placed 3.1 parts by weight of 1,3-dimethyl-4-imino-dihydrouracil and 15 parts by weight of chloroform and the mixture agitated. To this slurry is slowly added with agitation 3.2 parts by weight of bromine in 7.8 parts by weight of chloroform while maintaining the temperature at 0–5° C. Upon completion of the bromine addition the mass is agitated for a few minutes at 0–5° C. The mass is then filtered and 4.2 parts by weight of white solid collected. This solid upon recrystallization from water is identified as the hy-

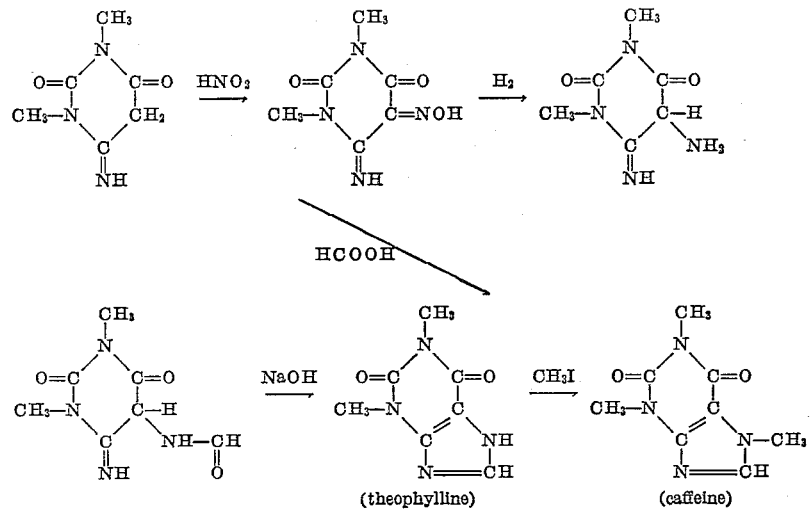

(theophylline)     (caffeine)

drogen bromide salt of 1,3-dimethyl-4-imino-5-bromo-dihydrouracil which possesses a melting point in excess of 300° C. The hydrogen bromide salt so obtained is admixed with a dilute aqueous solution of sodium bicarbonate containing a sufficient amount of sodium bicarbonate to neutralize the said salt. The neutralized mass is filtered, and the white solid collected, dried and recrystallized from chloroform. The white crystalline solid so obtained is 1,3-dimethyl-4-imino-5-bromo-dihydrouracil (M. P. 216–218° C.).

The hydrogen chloride salt of 1,3-dimethyl-4-imino-5-chloro-dihydrouracil is obtained by bubbling gaseous chlorine through a chloroform slurry of 1,3-dimethyl-4-imino-dihydrouracil until substantially an equimolecular proportion of chlorine is absorbed. Upon recovering and neutralizing (e. g. with aqueous potassium bicarbonate) white solid 1,3-dimethyl-4-imino-5-chloro-dihydrouracil is obtained.

In the halogenation of 1,3-dimethyl-4-imino-dihydrouracil any inert liquid may be employed whether it be a solvent or a non-solvent for the respective reagents or halogenated product. By inert liquid is meant any liquid which is non-reactive under conditions of the reaction system, examples of which are chloroform, chlorbenzene, heptane, etc. In large scale manufacture employing bromine as the halogenating agent, water is particularly ideal. During the halogenation step any temperature may be employed which is not below the freezing point of the inert liquid or above the decomposition temperature of the uracil reactant or uracil product. It is preferred, however, that temperatures in the range of 0–30° C. be employed. For economy and minimizing possible side reactions it is preferred that substantially equimolecular amounts of halogen and 1,3-dimethyl-4-imino-dihydrouracil be used.

In the neutralization of the hydrogen halide salt to provide the free base, other alkalies than the alkali metal bicarbonates may be used, e. g. sodium hydroxide, potassium hydroxide, sodium carbonate, potassium carbonate, etc. In general this neutralization step is most effectively carried out at about 10 to 30° C., however, higher or lower temperatures may be employed depending upon the circumstances.

As illustrative of the preparation of xanthines from the 1,3-dimethyl-4-imino-5-halo-dihydrouracils of this invention is the following:

*Example II*

1.5 parts by weight of 1,3-dimethyl-4-imino-5-bromo-dihydrouracil is admixed with a solution containing 20 parts by weight of N-methyl formamide and 0.37 parts by weight of sodium hydride. The mixture is refluxed at 110–120° C. (35–40 mm. of Hg pressure) for about 4 hours while removing the water by-product as it forms. The residue is then subjected to vacuum distillation (2 mm. of Hg) to remove the excess of N-methyl formamide. This residue is then dissolved in 10 parts by weight of water and the aqueous solution so obtained extracted with several small portions of chloroform. The extracts are combined and dried over magnesium sulfate. The so dried extract is then evaporated to dryness. The dry white crystalline product which contains 93% caffeine is then recrystallized from water to give pure caffein. The conversion to caffeine is 70%.

Replacing N-methyl formamide of Example II with an equal weight of formamide a good yield of theophylline is obtained.

While in the preparation of theophylline or caffeine from 1,3-dimethyl-4-imino-5-(chloro or bromo)-dihydrouracil the usage of the pure alkali metal derivative of formamide of N-methyl formamide is contemplated, it is preferred that it be used in the form of formamide or N-methyl formamide solution of the alkali metal hydride, the excess of formamide or N-methyl formamide present being determined by practical considerations. It is particularly preferred that the respective reactants be employed in substantially equimolecular proportions.

A wide range of temperatures may be employed in the preparation of caffeine or theophylline from 1,3-dimethyl-4-imino-5-(chloro or bromo)-dihydrouracil according to the process of this invention, however, it is preferred that the reaction be conducted below atmospheric pressure and at a temperature which provides gentle reflux.

While this invention has been described with respect to certain embodiments, it is not so limited and it is to be understood that variations and modifications thereof obvious to one skilled in the art may be made without departing from the spirit or scope thereof.

What is claimed is:

1. The process for making a xanthine of the structure

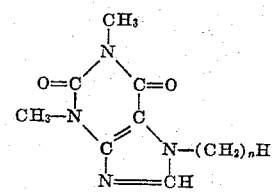

where $n$ is an integer from 0 to 1, which comprises reacting 1,3-dimethyl-4-imino-5-halo-dihydrouracil, wherein the 5-halo substituent is selected from the group consisting of chlorine and bromine, with a substantially equimolecular proportion of an alkali metal formamide of the structure

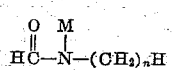

where M is an alkali metal and where $n$ is an integer from 0 to 1 with the elimination of water as a by-product of the condensation.

2. The process for making caffeine which comprises refluxing a substantially equimolecular weight mixture of 1,3-dimethyl-4-imino-5-bromo-dihydrouracil and sodium N-methyl formamide with the elimination of water as a by-product of the condensation.

References Cited in the file of this patent

UNITED STATES PATENTS 2,731,465   Schroeder _____ Jan. 17, 1956

OTHER REFERENCES

Beilstein: 1st Supp., vol. 24, p. 410.